United States Patent
Miyake (10) Patent No.: US 7,832,951 B2
(45) Date of Patent: Nov. 16, 2010

(54) LENS UNIT AND DIGITAL CAMERA

(75) Inventor: Izumi Miyake, Saitama (JP)

(73) Assignee: Fujifilm Corporation, Tokyo (JP)

( * ) Notice: Subject to any disclaimer, the term of this patent is extended or adjusted under 35 U.S.C. 154(b) by 943 days.

(21) Appl. No.: 11/703,181

(22) Filed: Feb. 7, 2007

(65) Prior Publication Data

US 2007/0196100 A1 Aug. 23, 2007

(30) Foreign Application Priority Data

Feb. 21, 2006 (JP) .............................. 2006-044257

(51) Int. Cl.
*G03B 17/00* (2006.01)
(52) U.S. Cl. ................. 396/529; 396/439; 396/531; 348/222.1
(58) Field of Classification Search ............. 396/310, 396/322, 323, 335, 528, 529, 531, 532; 348/364
See application file for complete search history.

(56) References Cited

U.S. PATENT DOCUMENTS

| | | | | |
|---|---|---|---|---|
| 4,750,212 A | * | 6/1988 | Yokomizo | 382/235 |
| 5,524,071 A | * | 6/1996 | Yokomizo | 382/284 |
| 5,790,193 A | * | 8/1998 | Ohmori | 348/375 |
| 6,327,001 B1 | | 12/2001 | Yamagishi | |
| 6,614,945 B1 | * | 9/2003 | Takaoka | 382/274 |
| 2004/0090538 A1 | * | 5/2004 | Kadohara | 348/230.1 |
| 2005/0219404 A1 | * | 10/2005 | Kobayashi | 348/362 |

FOREIGN PATENT DOCUMENTS

JP 1-177737 U 12/1989

* cited by examiner

*Primary Examiner*—W. B. Perkey
*Assistant Examiner*—Warren K Fenwick
(74) *Attorney, Agent, or Firm*—Sughrue Mion, PLLC (57) ABSTRACT

A digital still camera includes a camera main unit and a lens unit or lens assembly. The camera main unit has an image processor for image processing of an image being formed by image pickup. A frame memory stores the image during image processing. The lens unit is secured to the camera main unit removably, and has an image sensor for forming the image by detecting object light passed through a photographing lens. A subsidiary image memory has a storage capacity according to a pixel number of the image sensor, for storing the image in a temporary manner in addition to the frame memory, to shorten image processing time. In one embodiment, at least one of the frame memory and the subsidiary image memory is caused to store luminance component data and chrominance component data of the image obtained according to an image signal thereof.

12 Claims, 9 Drawing Sheets

LENS UNIT AND DIGITAL CAMERA

BACKGROUND OF THE INVENTION

1. Field of the Invention

The present invention relates to a digital camera and lens unit. More particularly, the present invention relates to a digital camera and lens unit in which degree of freedom in selecting an image sensor can be high.

2. Description Related to the Prior Art

A digital still camera is widely used, and includes a CCD or CMOS image sensor to photograph an object image to create image data of a digital form. In the digital still camera, image data is created by a CCD image sensor, and written to a frame memory as work memory. The image data is processed in image processing of various conditions, for example, Y/C processing of conversion into luminance component data Y and chrominance component data C in image data, distortion eliminating correction for correcting distortion, shading processing for adjusting shading of image, gamma correction, and the like.

JP-U 1-177737 discloses an example of the digital still camera having a camera main unit and a lens unit or lens assembly. The camera main unit includes a signal processor, frame memory and the like. The lens unit includes a photographing lens, image sensor and the like. The lens unit is removably secured to the camera main unit. A plurality of types of the lens unit are prepared as exchange lenses, so a selected one of those can be used in combination with the camera main unit for variety in photographing images.

If the pixel number of the image sensor is high, a data size of image data obtained by the image sensor is also great. A problem may occur if the pixel number of the image sensor is extremely high in comparison with the storage capacity of the frame memory. For example, very long time is required for image processing, or image processing is interrupted. In the lens unit of the known technique, an image sensor must have the number of pixels according to the storage capacity of the frame memory in the camera main unit. Thus, degree of freedom in selecting the image sensor is small or limited.

It is conceivable to incorporate a frame memory of a large storage capacity in the camera main unit. However, the cost of the frame memory will be high. A user who is familiar with popular types of the lens unit will be obliged to use an expensive type, because of the structure distinct from an image sensor with a low number of pixels.

SUMMARY OF THE INVENTION

In view of the foregoing problems, an object of the present invention is to provide a digital camera and lens unit or lens unit in which degree of freedom in selecting an image sensor can be high.

In order to achieve the above and other objects and advantages of this invention, a lens unit or lens assembly for mounting on a camera main unit in a removable manner includes a photographing lens for forming an image of an object. An image sensor produces an image signal by photoelectric conversion of the image. A subsidiary image memory stores the image signal from the image sensor in a temporary manner before transmission to the camera main unit.

Furthermore, there is a subsidiary image processor for image processing of the image signal read from the subsidiary image memory, and for outputting processed image data.

The storage capacity of the subsidiary image memory is sufficiently high for storing data of the image from the image sensor before the image processing and also data of the image after the image processing.

At least one of the frame memory and the subsidiary image memory is caused to store luminance component data and chrominance component data of the image obtained according to an image signal thereof by the image processor or the subsidiary image processor.

Also, a digital camera including a camera main unit and a lens unit or lens assembly is provided, the camera main unit including a frame memory for storing an image, and an image processor for image processing of the image by use of the frame memory, the lens unit being secured to the camera main unit removably. In the digital camera, the lens unit includes an image sensor for forming the image by detecting object light passed through a photographing lens. A subsidiary image memory has a storage capacity according to a pixel number of the image sensor, for storing the image in a temporary manner in addition to the frame memory, to shorten image processing time.

Furthermore, a subsidiary image processor is incorporated in the lens unit, for image processing of the image read from the subsidiary image memory.

At least one of the frame memory and the subsidiary image memory is caused to store luminance component data and chrominance component data of the image obtained according to an image signal thereof by the image processor or the subsidiary image processor.

The subsidiary image memory is caused to store an image signal of the image. One of the subsidiary image memory and the frame memory is caused to store first data obtained by image processing according to the image signal. The frame memory is caused to store processed image data of the image obtained by image processing according to the first data.

The image processor and the subsidiary image processor are used selectively, and determine the first data according to the image signal.

Furthermore, a pixel number evaluator compares the pixel number with a predetermined reference number. If the pixel number is equal to or smaller than the reference number, the frame memory is caused to store the first data. If the pixel number is greater than the reference number, the subsidiary image memory is caused to store the first data.

The first data is luminance component data and chrominance component data of the image.

In one preferred embodiment, the first data is luminance component data of the image, and the frame memory is further caused to store chrominance component data of the image.

In another preferred embodiment, the frame memory is caused to store the first data in relation to a first portion of the image. The subsidiary image memory is caused to store the first data in relation to a second portion of the image being different from the first portion.

In one preferred embodiment, the subsidiary image memory is adapted to a consecutive photographing mode of photographing plural images consecutively upon releasing operation. The frame memory is caused to store the first data in relation to a (2N−1)th image of the plural images, and N is an integer. The subsidiary image memory is caused to store the first data in relation to a (2N)th image of the plural images.

In still another preferred embodiment, the frame memory is caused to store the first data in relation to a first image line of plural image lines included in the image. The subsidiary image memory is caused to store the first data in relation to a second image line of the plural image lines succeeding to the first image line.

In one preferred embodiment, the image processor and the subsidiary image processor are used selectively for the image processing in a common manner.

The frame memory is caused to store data obtained by image processing of a first image. The subsidiary frame memory is caused to store data obtained by image processing of a second image succeeding to the first image.

In another preferred embodiment, furthermore, there is a controller for control in first and second processing modes, wherein the image processor and the subsidiary image processor, when in the first processing mode, operate for the image processing in a different manner from one another, and when in the second processing mode, are used selectively for image processing in a common manner.

When in the first processing mode, the subsidiary image memory is caused to store an image signal of the image, one of the subsidiary image memory and the frame memory is caused to store first data obtained by image processing according to the image signal, and the frame memory is caused to store processed image data of the image obtained by image processing according to the first data. When in the second processing mode, the frame memory is caused to store data obtained by image processing of a first image of plural images, and the subsidiary frame memory is caused to store data obtained by image processing of a second image of the plural images succeeding to the first image.

The second processing mode is a consecutive photographing mode of photographing plural images consecutively upon releasing operation.

The image signal output by the image sensor is a three primary color signal, the subsidiary image processor converts the three primary color signal into chrominance component data, and the image processor converts the three primary color signal into luminance component data.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENT(S) OF THE PRESENT INVENTION

Figure 1:
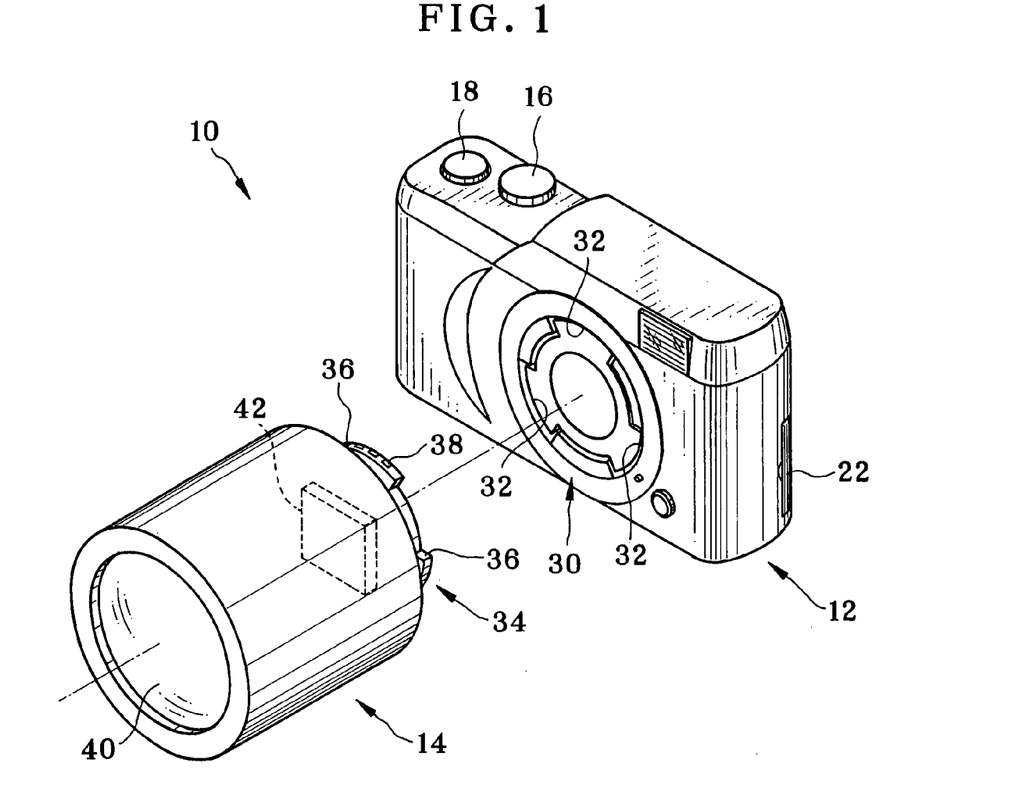
FIG. 1 is a perspective view illustrating a digital still camera.
Figure 2:
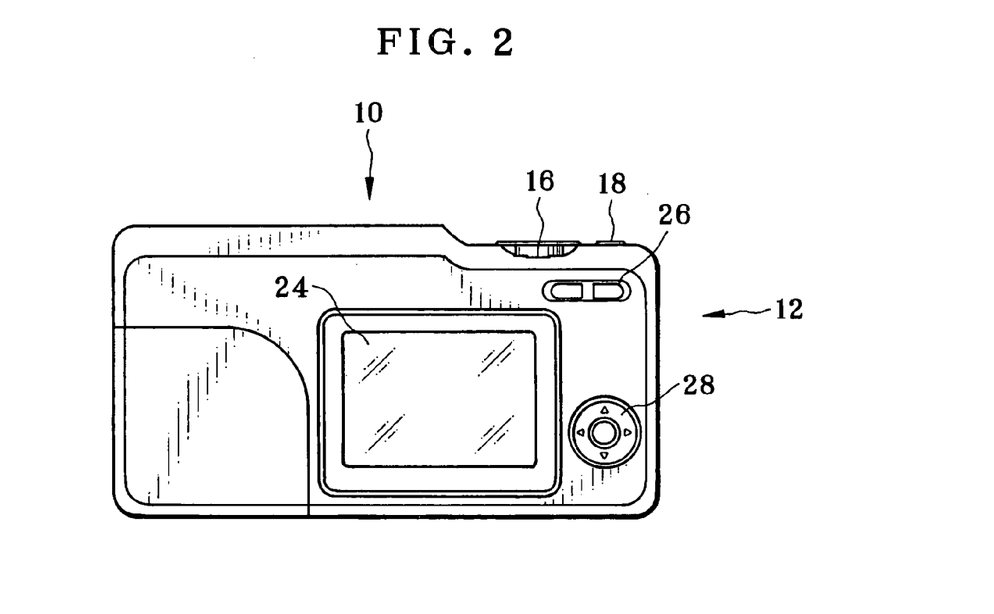
FIG. 2 is a rear elevation illustrating the digital still camera.

In FIGS. 1 and 2, a digital still camera 10 of the invention includes a camera main unit 12 and a lens unit or lens assembly 14 removably set on the camera main unit 12. The camera main unit 12 has a box shape, and has an upper face where a mode selection wheel 16 and a shutter button 18 are disposed. A lid 22 is disposed on end face of the camera main unit 12. A memory card 20 is removably loaded in a memory card slot which will be covered by the lid 22. See FIG. 3. The camera main unit 12 has a rear face where an LCD monitor display panel 24, a zoom button 26 in a user interface, and a cursor button 28 in a user interface are disposed.

The mode selection wheel 16 is settable in four positions for turning off, a photographing mode, playback mode and setup mode. In the photographing mode, a live image is displayed on the LCD 24. In the photographing mode, the shutter button 18 is depressed to write image data of an image to the memory card 20. In the playback mode, the image is read from the memory card 20 and displayed on the LCD 24 in the playback manner. The zoom button 26 has button portions for zooming in and zooming out, and is depressible for changing optical magnification. The cursor button 28 is used mainly in the setup mode, for inputting conditions for a setting.

A lens mount mechanism 30 is disposed on a front face of the camera main unit 12 for connection with the lens unit 14. Bayonet channels 32 are formed in the lens mount mechanism 30. A coupling mechanism 34 is formed on a rear face of the lens unit 14 and opposed to the lens mount mechanism 30. Bayonet lugs 36 protrude in the coupling mechanism 34.

The bayonet lugs 36 are positioned at and inserted into the bayonet channels 32, and rotated in the clockwise direction for engagement between the lens mount mechanism 30 and the coupling mechanism 34. The camera main unit 12 is connected with the lens unit 14 mechanically. Terminals 38 of the bayonet lugs 36 come in contact with terminals (not shown) of the bayonet channels 32, to connect the camera main unit 12 electrically with the lens unit 14.

A photographing lens 40 is contained in a front portion of the lens unit 14. A CCD image sensor 42 for image pickup is disposed in the lens unit 14 for pickup of object light passed through the photographing lens 40. The lens unit 14 is a selected one of plural exchangeable lens assemblies, including lenses of different focal lengths in the photographing lens 40, lenses of different numbers of pixels in the CCD image sensor 42, a lens adapted to monochromatic photography, and a lens adapted to infrared photography. Selective use of the lens unit 14 with the camera main unit 12 in the digital still camera 10 makes it possible to acquire image data easily in any of various scenes.

Figure 3:
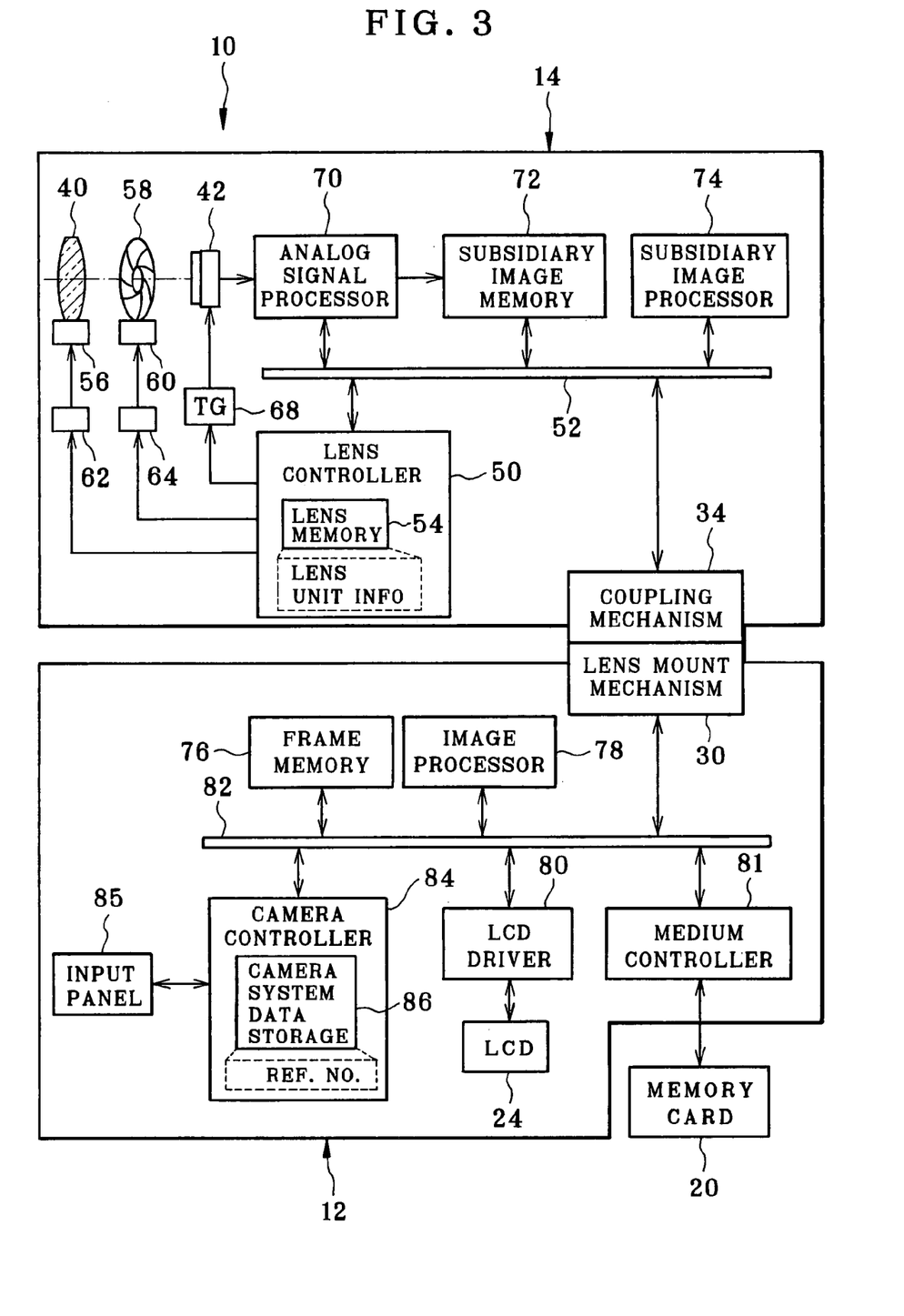
FIG. 3 is a block diagram schematically illustrating the digital still camera.

In FIG. 3, a lens controller 50 is disposed in the lens unit 14 for controlling elements in the lens unit 14. A data bus 52 connects the lens controller 50 to various circuits in the lens unit 14. Control signals are generated in the camera main unit 12, and received by the lens controller 50 through terminals in the lens mount mechanism 30 and the coupling mechanism 34, to drive or control circuits in the lens unit 14.

A lens memory 54 in a camera system is provided in the lens controller 50. Programs and information is stored in the lens memory 54, including a control program for controlling the lens unit 14, setup information, pixel number information of the CCD image sensor 42 and other information relevant to the type of the lens unit 14.

The photographing lens 40 includes a zoom lens for changing an optical magnification of image pickup, and a focusing lens for adjusting focusing. A lens driving mechanism 56 including a motor drives the photographing lens 40. An aperture stop mechanism 58 changes an aperture stop diameter. A driving mechanism 60 including a motor drives the aperture stop mechanism 58. Motor drivers 62 and 64 are controlled by the lens controller 50, and drive the lens driving mechanism 56 and the driving mechanism 60.

The CCD image sensor 42 is disposed behind the photographing lens 40. The CCD image sensor 42 as well-known in the art is a photoelectric converting device for storing electric charge according to an amount of received light for each pixel. A timing generator (TG) 68 generates the transfer clock of vertical and horizontal transfer, in synchronism with which the CCD image sensor 42 outputs an image signal of a serial form line after line according to the stored charge for the pixels. When the digital still camera 10 is set in the photographing mode, the CCD image sensor 42 photographs an image in a smaller number of pixels for the purpose of forming a live image. When the shutter button 18 is depressed in the photographing mode, the CCD image sensor 42 photographs an image to be recorded by full use of the pixels.

An analog signal processor 70 is supplied with image data of analog form constituted by image signals of lines and output by the CCD image sensor 42. The analog signal processor 70 includes an amplifier (not shown), a correlated double sampling circuit (CDS), A/D converter and the like, and processes the image data in processing of amplification of the signal width, elimination of electric noise, digital conversion, to produce RAW image data as digital image data having three primary color image signals.

A subsidiary image memory 72 stores RAW image data output by the analog signal processor 70. The subsidiary image memory 72 is additional to a frame memory 76 as a work memory for storing image data in a temporary manner. An example of the subsidiary image memory 72 is SDRAM, of which storage capacity is predetermined according to the pixel number of the CCD image sensor 42 and a type of image data to be stored in the subsidiary image memory 72. In the embodiment, the RAW image data and the Y/C image data are stored in the subsidiary image memory 72. A data size of the RAW image data and Y/C image data is determined according to the pixel number of the CCD image sensor 42. The storage capacity of the subsidiary image memory 72 is determined in such a sufficient manner as to store both of the RAW image data and Y/C image data at one time.

A subsidiary image processor 74 is additional to an image processor 78. If the number of pixels of the CCD image sensor 42 is higher than a reference number or threshold value predetermined suitably, the subsidiary image processor 74 is driven for Y/C processing to convert RAW image data to Y/C image data having the luminance component data Y and the chrominance component data C. The subsidiary image processor 74 reads RAW image data from the subsidiary image memory 72, and processes the RAW image data in the Y/C processing, and outputs Y/C image data to write to the subsidiary image memory 72.

The image processor 78 is incorporated in the camera main unit 12 as well as the frame memory 76. The frame memory 76 stores image data in a temporary manner in a manner similar to the subsidiary image memory 72. If the number of the pixels of the CCD image sensor 42 is smaller than the reference number later to be described, the image processor 78 reads RAW image data from the subsidiary image memory 72, processes the RAW image data by Y/C processing, so Y/C image data is produced and written to the frame memory 76.

The image processor 78 reads Y/C image data from the subsidiary image memory 72 or the frame memory 76, and processes the Y/C image data in image processing of various conditions, for example, distortion eliminating correction for correcting distortion, shading processing for adjusting shading of image, gamma correction, and the like. Processed image data is written to the frame memory 76.

Images stored in the frame memory 76 include a live image. An LCD driver 80 converts data of the live image into an NTSC signal, which is output to the LCD 24. Also, the images in the frame memory 76 include recorded images in a fully reproducing format without thinning. A medium controller 81 compresses the recorded images in the JPEG format, and writes the recorded images to the memory card 20.

A camera controller 84 is incorporated in the camera main unit 12. A data bus 82 connects various elements to the camera controller 84. An input panel 85 in a user interface is constituted by the mode selection wheel 16, the shutter button 18, the zoom button 26 and the cursor button 28. The camera controller 84 receives control signals from the input panel 85, and controls the circuits in the camera main unit 12. Also, the camera controller 84 sends signals to the lens controller 50 through the lens mount mechanism 30 and the coupling mechanism 34, to drive various elements in the lens unit 14.

A camera system data storage 86 is incorporated in the camera controller 84. Programs and information is stored in the camera system data storage 86, including a control program for controlling the digital still camera 10, image processing program, and setup information. Also, data of a reference number or threshold value is stored in the camera system data storage 86 for selecting one of the subsidiary image processor 74 and the image processor 78 for Y/C processing. The reference number is the maximum number of the pixels of the CCD image sensor 42 at which the Y/C processing is possible in the image processor 78, and is the number of pixels of the CCD image sensor 42 at the time that a sum of data sizes of Y/C image data and processed image data becomes equal to the storage capacity of the frame memory 76.

Figure 4:
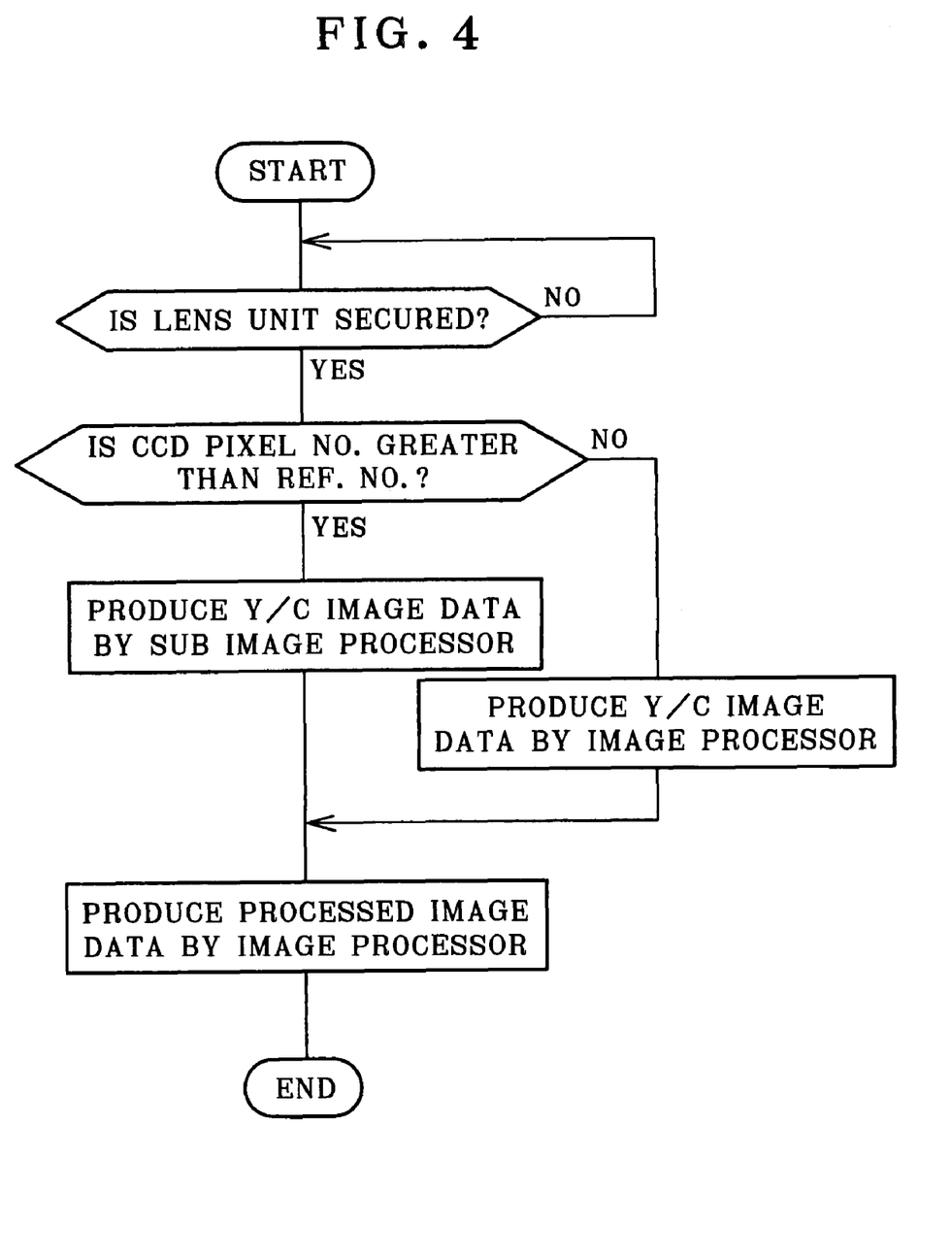
FIG. 4 is a flow chart illustrating image processing.
Figure 5A:
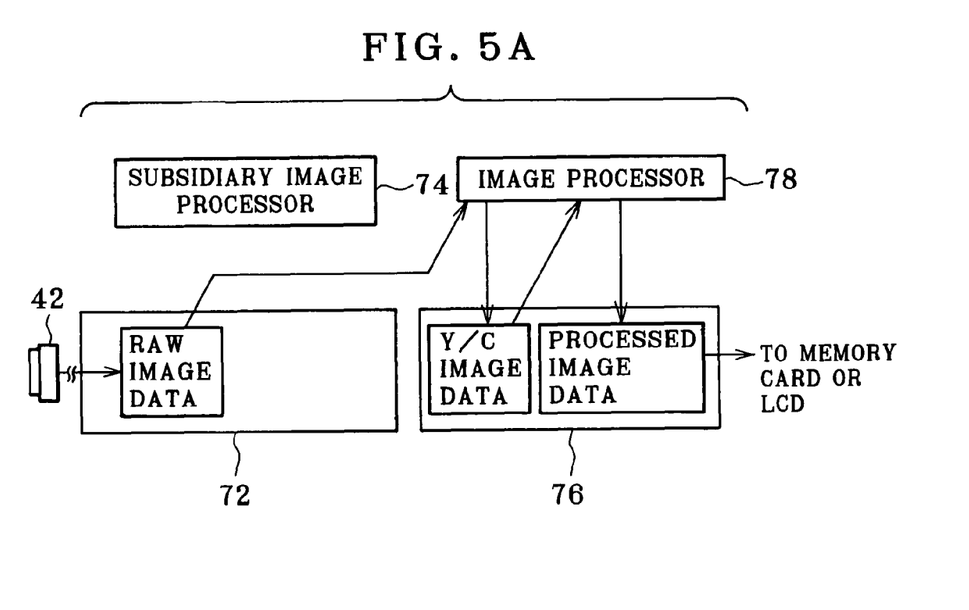
FIG. 5A is an explanatory view in a diagram illustrating steps of the image processing at the time of a small pixel number of a CCD.

In FIG. 4, the camera controller 84 detects a set state of the lens unit 14 on the camera main unit 12, and in response to this, refers to data stored in the lens memory 54 of the lens unit 14 to check the number of pixels of the CCD image sensor 42. As a pixel number evaluator, the camera controller 84 compares the checked number of the pixels with the reference number. If the number of the pixels is found equal to or smaller than the reference number, then the total data size of the Y/C image data and the processed image data is equal to or smaller than the storage capacity of the frame memory 76. Y/C processing of the image processor 78 is enabled. In FIG. 5A, the image processor 78 obtains the Y/C image data by Y/C processing.

Figure 5B:
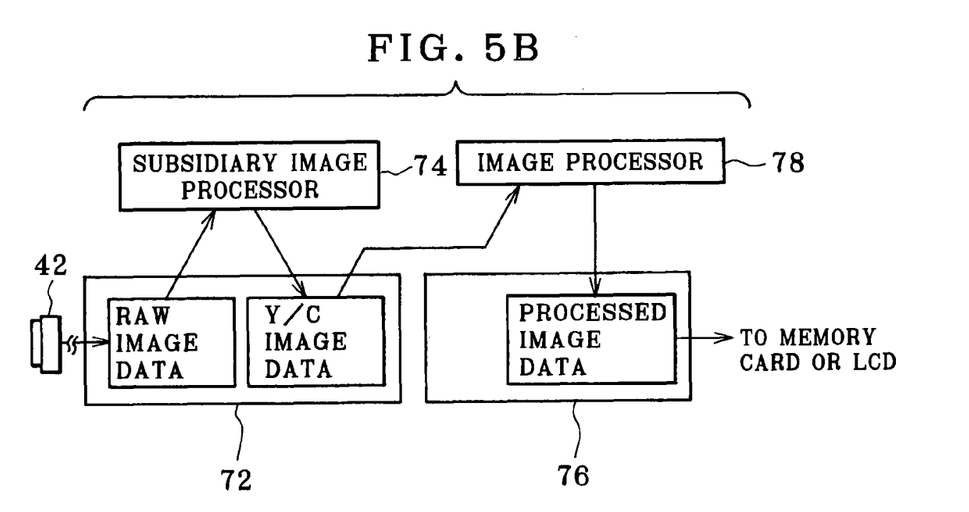
FIG. 5B is an explanatory view in a diagram illustrating steps of the image processing at the time of a great pixel number of the CCD.

If the number of the pixels is found greater than the reference number, then the total data size of the Y/C image data and the processed image data is greater than the storage capacity of the frame memory 76. Y/C processing of the image processor 78 is impossible. In FIG. 5B, the subsidiary image processor 74 obtains the Y/C image data by Y/C processing. The image processor 78 is controlled by the camera controller 84 and processes Y/C image data read from the subsidiary image memory 72 or the frame memory 76, and produces processed image data.

In conclusion, the subsidiary image memory 72 is provided in the lens unit 14 for storing Y/C image data particularly in case storage capacity of the frame memory 76 in the camera main unit 12 is insufficient. It is possible to process images without difficulty if the number of pixels of the CCD image sensor 42 is very high.

There is not restriction of the number of pixels of the CCD image sensor 42 usable with the lens unit 14 even in view of the storage capacity of the frame memory 76 of the camera main unit 12. There is high degree of freedom in selecting the CCD image sensor 42 combined with the lens unit 14. Also, the subsidiary image memory 72 according to the pixel number of the CCD image sensor 42 can be used for each of the lens unit 14. There is no extremely high cost in comparison with the structure with the frame memory 76 having a great storage capacity in the camera main unit 12 together with the high number of pixels of the CCD image sensor 42 in the lens unit 14.

Figure 6:
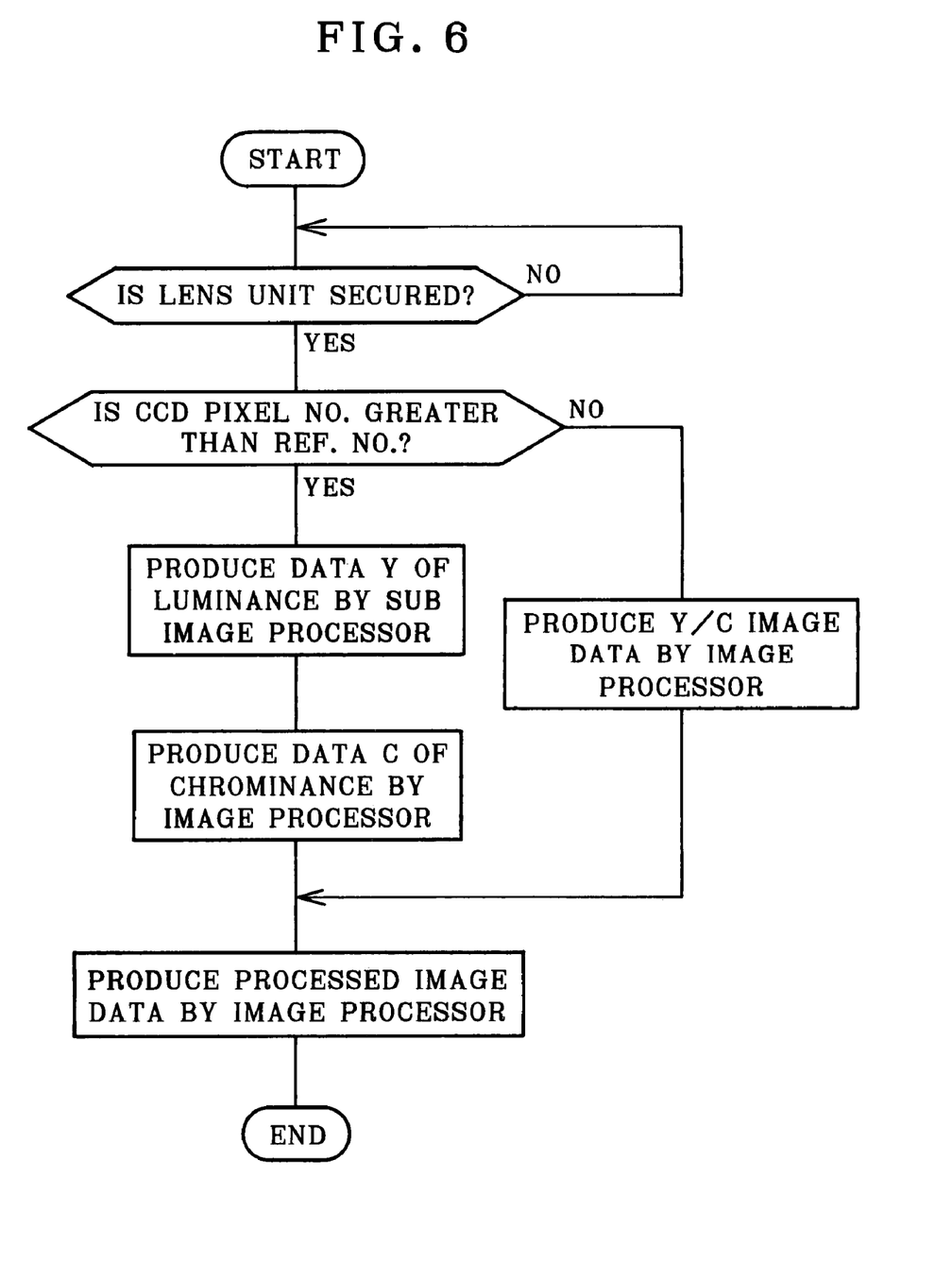
FIG. 6 is a flow chart illustrating one preferred process of image processing in which luminance component data is treated differently.
Figure 7A:
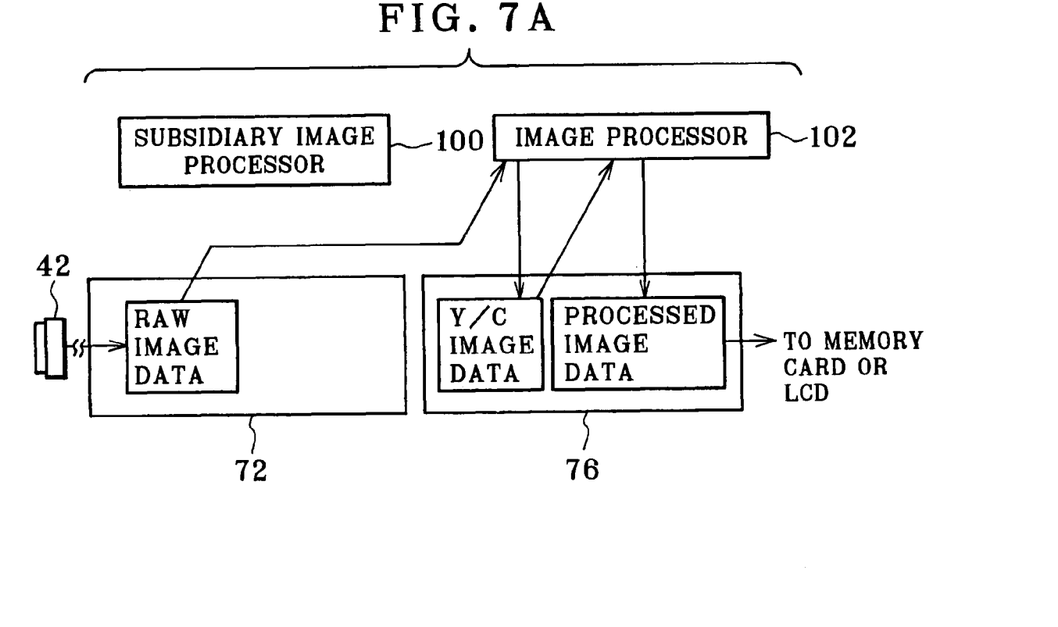
FIGS. 7A and 7B are explanatory views in diagrams illustrating steps of the image processing of FIG. 6.
Figure 7B:
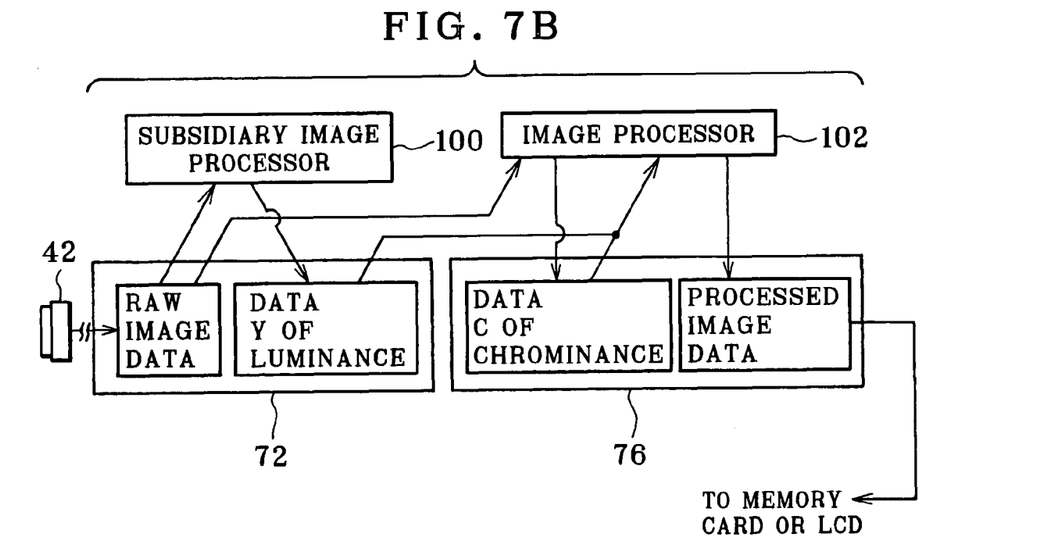

Various modifications are possible in connection with the subsidiary image memory in the lens unit. In FIGS. 6, 7A and 7B, another preferred camera has a subsidiary image processor 100 and an image processor 102. Image processing of a type further to the above embodiments is combined. In FIG. 6, elements similar to those of the above embodiment are designated with identical reference numerals.

In FIGS. 6, 7A and 7B, the image processor 102 carries out the Y/C processing if the pixel number of the CCD image sensor 42 is equal to or smaller than the reference number or threshold value as illustrated in FIG. 7A. Also, the subsidiary image processor 100 operates if the pixel number of the CCD image sensor 42 is greater than the reference number as illustrated in FIG. 7B. The subsidiary image processor 100 determines luminance component data Y according to the RAW image data read from the subsidiary image memory 72, and then writes the luminance component data Y to the subsidiary image memory 72. The image processor 102 determines chrominance component data C from the RAW image data read from the subsidiary image memory 72, and writes the chrominance component data C to the frame memory 76. The image processor 102 produces processed image data by processing of various operations according to the luminance component data Y read from the subsidiary image memory 72 and the chrominance component data C read from the frame memory 76.

Only the chrominance component data C is written to the frame memory 76 if the number of pixels of the CCD image sensor 42 is very high. Failure due to shortage in the storage capacity of the frame memory 76 can be prevented. Note that eyes of human beings are characteristically less sensitive to the chrominance component than the luminance component. So it is conceivable in the invention to thin an image signal at a predetermined ratio for the purpose of obtaining the chrominance component data C. A size of the data of the chrominance component data C can be kept small, so as to prevent failure due to insufficiency of the frame memory 76.

In the present invention, it is possible to store the chrominance component data C to the subsidiary image memory 72 and store the luminance component data Y to the frame memory 76. However, the chrominance component data C can be thinned so as to use data in a small data size. It is preferable to store the chrominance component data C to the frame memory 76 of the camera main unit 12 in view of likeliness of shortage in the storage capacity.

Figure 8:
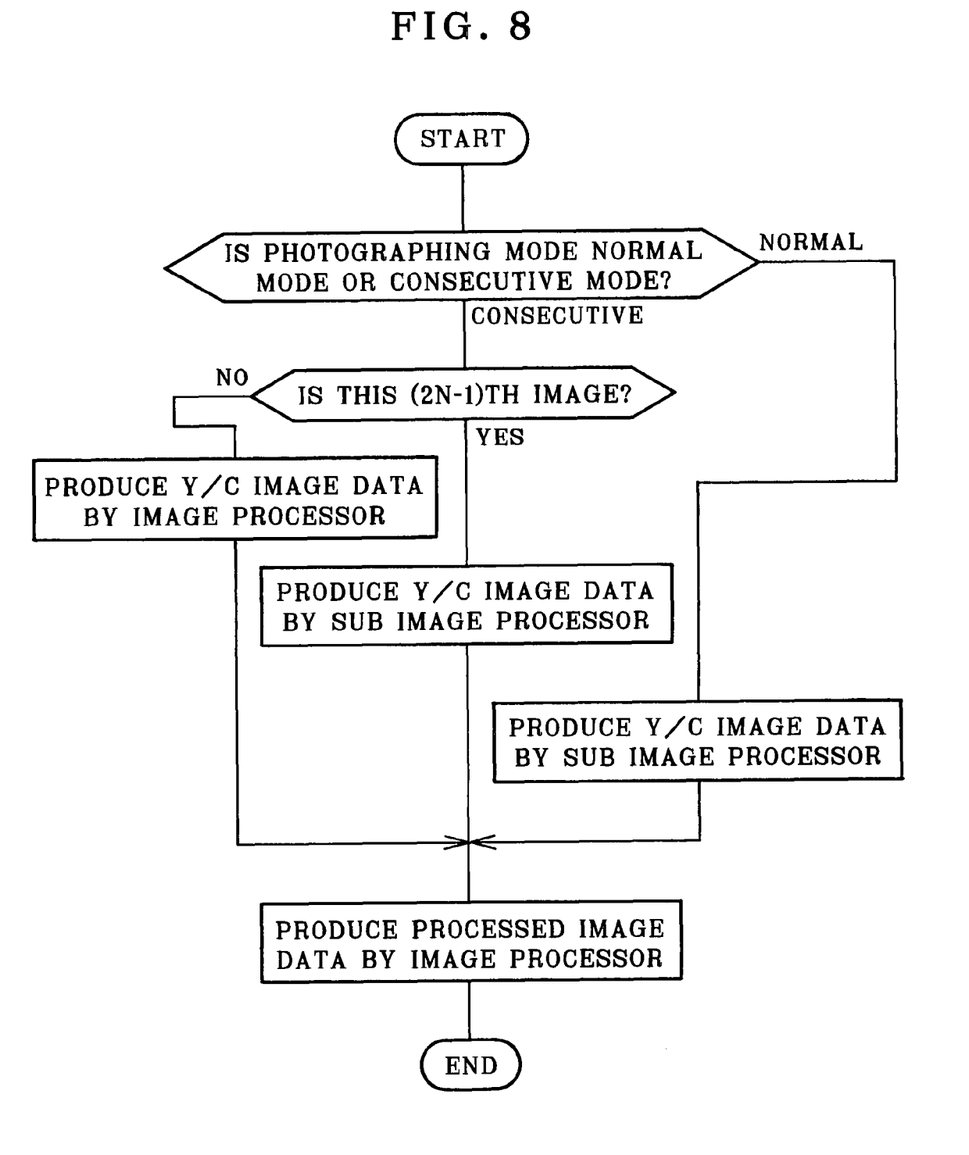
FIG. 8 is a flow chart illustrating another preferred process of image processing adapted to a consecutive photographing mode.
Figure 9A:
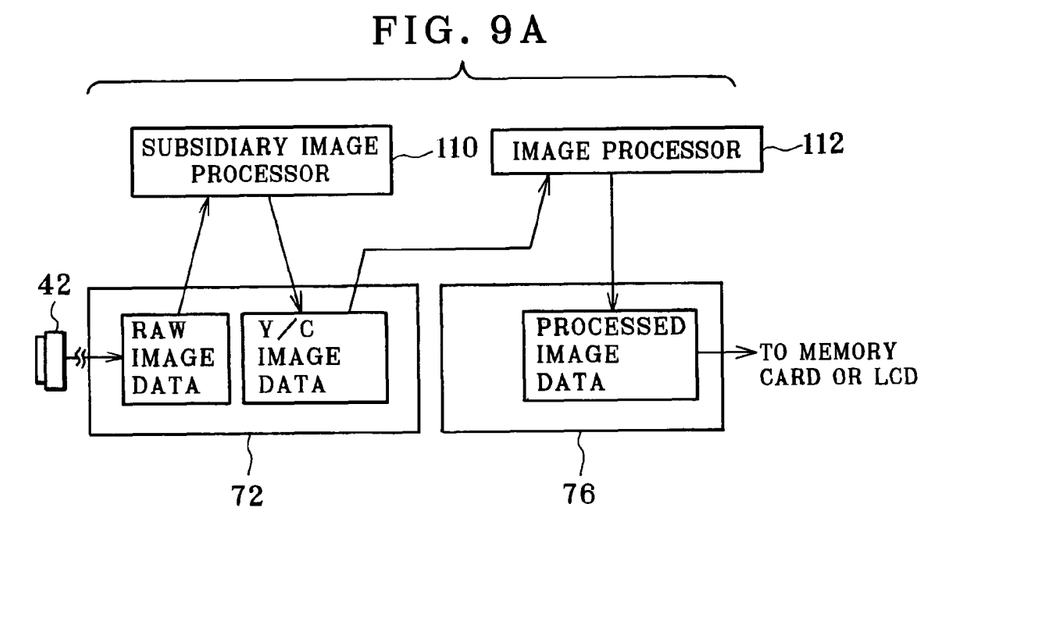
FIGS. 9A and 9B are explanatory views in diagrams illustrating steps of the image processing of FIG. 8.
Figure 9B:
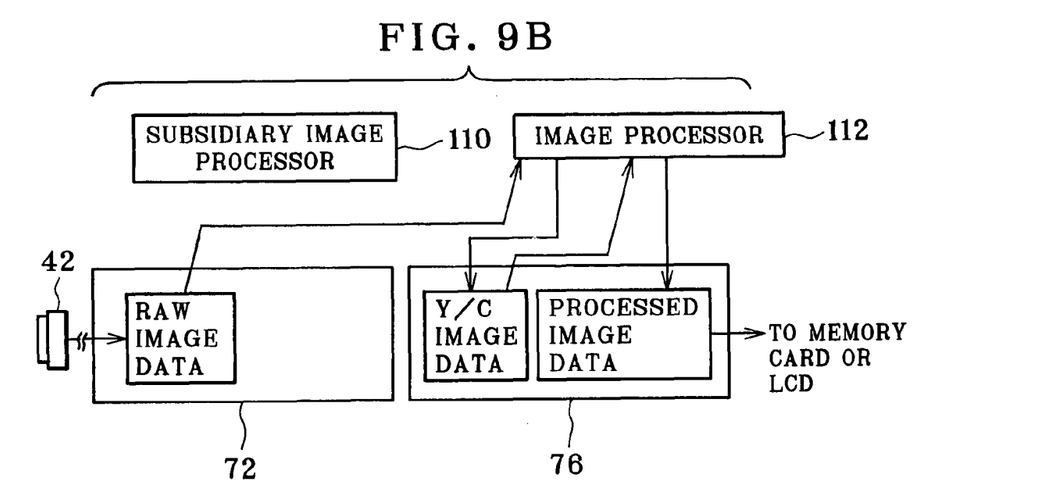

Also, a digital camera may be constructed in which a normal photographing mode and a consecutive photographing mode are settable. In the normal photographing mode, image data of one image is recorded by shutter release of one time. In the consecutive photographing mode, image data of plural consecutive images are recorded by consecutive photographing upon shutter release of one time. In FIGS. 8, 9A and 9B, such a digital camera includes a subsidiary image processor 110 and an image processor 112, which operate differently between the normal photographing mode and the consecutive photographing mode.

In the normal photographing mode, the subsidiary image processor 110 produces Y/C image data as illustrated in FIG. 9A. At the (2N−1)th time of image pickup in the consecutive photographing mode or at an odd number of times, the subsidiary image processor 110 produces Y/C image data as illustrated in FIG. 9A. At the (2N)th time of image pickup in the consecutive photographing mode or at an even number of times, the image processor 112 produces Y/C image data as illustrated in FIG. 9B. After this, Y/C image data is read alternately from the subsidiary image memory 72 and from the frame memory 76 and processed in image processing, to produce processed image data. The subsidiary image processor 110 and the image processor 112 in the consecutive photographing mode operate alternatively for processing. Consecutive photographing at a high speed is possible by the increase in the processing speed.

Figure 10:
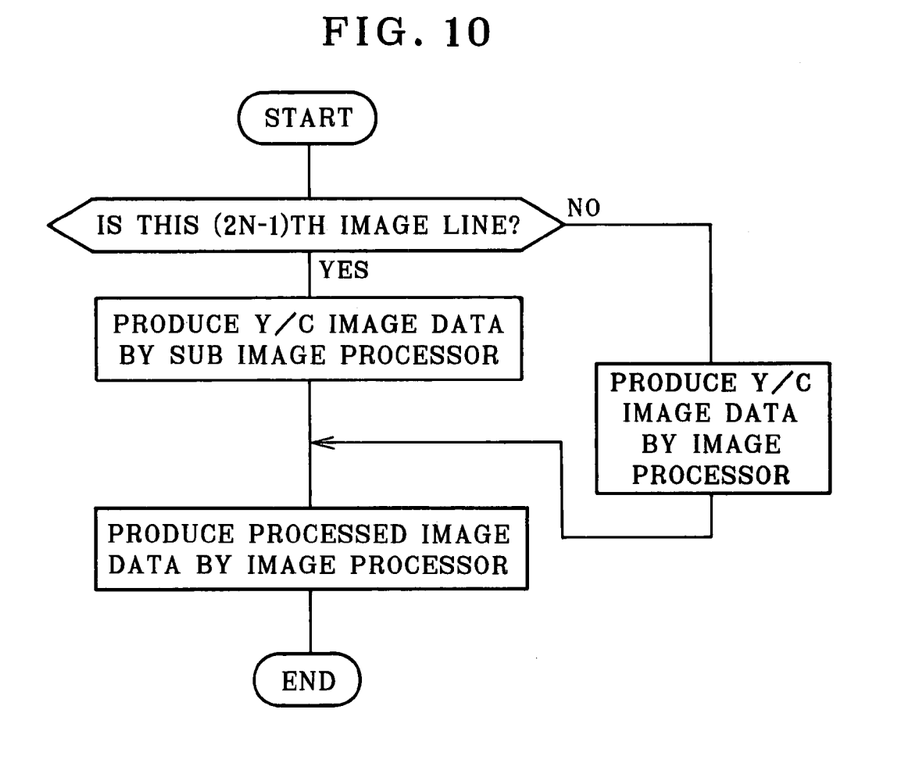
FIG. 10 is a flow chart illustrating still another preferred process of image processing in which image lines are alternately processed.
Figure 11:
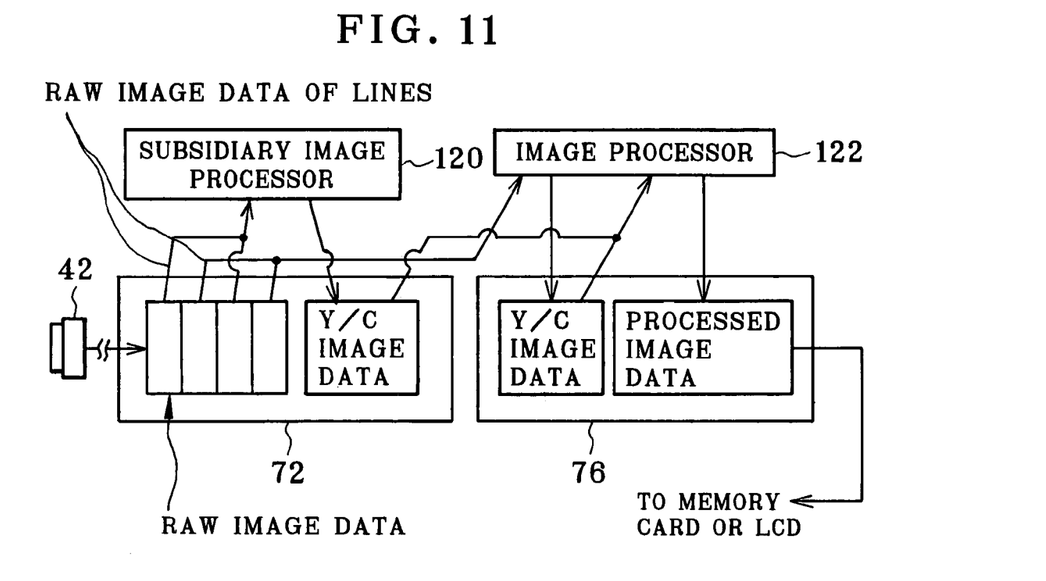
FIG. 11 is an explanatory view in a diagram illustrating steps of the image processing of FIG. 10.

In the above embodiment, processors for Y/C image processing are changed over by one image. However, changeover of processor in the invention may be carried out differently. In FIGS. 10 and 11, a subsidiary image processor 120 processes a first portion of one image for the Y/C processing. An image processor 122 processes a remaining portion of one image for the Y/C processing. In FIG. 11, RAW image data are split into data portions line by line in an image frame. The processes a first image line of the image for the Y/C processing. The image processor 122 processes a second image line of the image for the Y/C processing. Thus, processing speed can be raised.

In the above embodiments, the image processor 78 processes image data in distortion eliminating correction, shading processing, and gamma correction. However, the image processor 78 may operate for types of processing other than those. Also, the subsidiary image processor 74 may be used to process the Y/C image data in image processing of various conditions, for example, distortion eliminating correction for correcting distortion, shading processing for adjusting shading of image, gamma correction, and the like. Furthermore, the subsidiary image processor 74 in the lens unit and the image processor 78 in the camera main unit may be disposed together with one another and positions in either of the lens unit and the camera main unit.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A lens unit for mounting on a camera main unit in a removable manner, comprising:

a photographing lens for forming an image of an object;

an image sensor for producing an image signal by photoelectric conversion of said image;

a subsidiary image memory for storing said image signal from said image sensor in a temporary manner before transmission to said camera main unit;

a subsidiary image processor for image processing of said image signal read from said subsidiary image memory, and for outputting processed image data;

wherein said subsidiary image memory is further caused to store said processed image data from said subsidiary image processor in a temporary manner, wherein said subsidiary image memory has a storage capacity sufficiently high for storing said image signal from said image sensor and said image data from said subsidiary image processor at one time.

2. A digital camera including a lens unit and a camera main unit for mounting of said lens unit in a removable manner, comprising:

A. said lens unit including:
a photographing lens for forming an image of an object;
an image sensor for producing an image signal by photoelectric conversion of said image;
a subsidiary image memory for storing said image signal from said image sensor in a temporary manner;

B. said camera main unit including:
a frame memory for storing said image signal from said subsidiary image memory in a temporary manner;
an image processor for image processing of said image signal from said frame memory;
wherein an image data storage is used for storing said processed image data obtained by said image processing;
said camera further comprising a subsidiary image processor for image processing of said image signal read from said subsidiary image memory, wherein said subsidiary image memory is further caused to store said image signal from said subsidiary image processor in a temporary manner; and
wherein said subsidiary image memory has a storage capacity sufficiently high for storing said image signal from said image sensor and said image data from said subsidiary image processor at one time.

3. A digital camera as defined in claim 2, wherein said image signal output by said image sensor is a three primary color signal;
if a pixel number of said image sensor is equal to or smaller than a reference number, said image processor converts said three primary color signal into luminance component data and chrominance component data;
if said pixel number of said image sensor is greater than said reference number, said subsidiary image processor converts said three primary color signal into chrominance component data, and said image processor converts said three primary color signal into luminance component data.

4. A digital camera as defined in claim 2, wherein said subsidiary image processor and said image processor carry out said image processing in a common manner.

5. A digital camera as defined in claim 2, wherein said image signal from said image sensor is a three primary color signal, and in case of a first condition, said image processor is selected to convert said three primary color signal into luminance component data and chrominance component data, and in case of a condition different from said first condition, said subsidiary image processor is selected to convert said three primary color signal into luminance component data and chrominance component data.

6. A digital camera as defined in claim 5, wherein said first condition is a condition where a pixel number of said image sensor is equal to or smaller than a reference number.

7. A digital camera as defined in claim 2, wherein said image processor and said subsidiary image processor are alternately selected for said image processing for each one of images.

8. A digital camera as defined in claim 2, wherein said image processor and said subsidiary image processor are alternately selected for image processing for each one of image lines in said image.

9. A digital camera as defined in claim 2, further comprising a controller for setting a selected one of first and second processing modes, and said subsidiary image processor and said image processor, when in said first processing mode, carry out image processing in manners different from one another, and when in said second processing mode, carry out said image processing in a common manner.

10. A digital camera as defined in claim 9, wherein said subsidiary image processor and said image processor, when in said first processing mode, carry out said image processing of one image, and when in said second processing mode, carry out said image processing of images different from one another.

11. A digital camera as defined in claim 10, wherein said controller selectively sets said first processing mode for normal photography, and sets said second processing mode for consecutive photography.

12. A digital camera including a lens unit and a camera main unit for mounting of said lens unit in a removable manner, comprising:

A. said lens unit including:
a photographing lens for forming an image of an object;
an image sensor for producing an image signal by photoelectric conversion of said image;
a subsidiary image memory for storing said image signal from said image sensor in a temporary manner;

B. said camera main unit including:
a frame memory for storing said image signal from said subsidiary image memory in a temporary manner;
an image processor for image processing of said image signal from said frame memory;
wherein an image data storage is used for storing said processed image data obtained by said image processing; and
said camera further comprising a subsidiary image processor for image processing of said image signal read from said subsidiary image memory, wherein said subsidiary image memory is further caused to store said image signal from said subsidiary image processor in a temporary manner; and
wherein said subsidiary image processor and said image processor carry out image processing of said image signal of one image in manners different from one another.

* * * * *